United States Patent
Sugita (10) Patent No.: US 7,418,145 B2
(45) Date of Patent: Aug. 26, 2008

(54) COMPRESSION DEVICE AND DECOMPRESSION DEVICE

(75) Inventor: Toru Sugita, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 815 days.

(21) Appl. No.: 10/879,216

(22) Filed: Jun. 30, 2004

(65) Prior Publication Data

US 2006/0013496 A1    Jan. 19, 2006

(51) Int. Cl.
*G06K 9/36* (2006.01)
(52) U.S. Cl. .................. 382/243; 382/232; 382/233
(58) Field of Classification Search ............ 382/232, 382/242, 243, 233, 246
See application file for complete search history.

(56) References Cited

U.S. PATENT DOCUMENTS 5,572,605 A * 11/1996 Toraichi ............... 382/241
6,167,155 A * 12/2000 Kostrzewski et al. ....... 382/232

FOREIGN PATENT DOCUMENTS

| EP | 1134674 A1 | 9/2001 |
|---|---|---|
| JP | 2001-56823 | 2/2001 |
| JP | 2001-66146 | 3/2001 |
| JP | 2002-107169 | 4/2002 |

* cited by examiner

*Primary Examiner*—Duy M Dang
(74) *Attorney, Agent, or Firm*—Wenderoth, Lind & Ponack, L.L.P.

(57) ABSTRACT

In a compression device, a central processing unit acquires data containing a plurality of element points for specifying the shape of an object composing the map image, and thereafter calculates a second-order differential value of a predetermined one of the plurality of element points acquired. The second-order differential value is a differential value between a first-order differential value of the predetermined element point and a first-order differential value of an immediately preceding element point, and the first-order differential value is a differential value between a coordinate value of the predetermined element point and a coordinate value of the immediately preceding element point. The central processing unit further generates compressed data containing the second-order differential value calculated thereby.

13 Claims, 7 Drawing Sheets

| | | | |
|---|---|---|---|
| P0 | NORMALIZED COORDINATE VALUE | X0 | 2Byte |
| | | Y0 | 2Byte |
| | DIFFERENTIAL NUMBER 7 | | 1Byte |
| P1 | FIRST-ORDER DIFFERENTIAL VALUE | ΔX1 | 1Byte |
| | | ΔY1 | 1Byte |
| P2 | FIRST-ORDER DIFFERENTIAL VALUE | ΔX2 | 1Byte |
| | | ΔY2 | 1Byte |
| P3 | FIRST-ORDER DIFFERENTIAL VALUE | ΔX3 | 1Byte |
| | | ΔY3 | 1Byte |
| P4 | FIRST-ORDER DIFFERENTIAL VALUE | ΔX4 | 1Byte |
| | | ΔY4 | 1Byte |
| P5 | FIRST-ORDER DIFFERENTIAL VALUE | ΔX5 | 1Byte |
| | | ΔY5 | 1Byte |
| P6 | FIRST-ORDER DIFFERENTIAL VALUE | ΔX6 | 1Byte |
| | | ΔY6 | 1Byte |
| P7 | FIRST-ORDER DIFFERENTIAL VALUE | ΔX7 | 1Byte |
| | | ΔY7 | 1Byte |

LCRobj

COMPRESSION DEVICE AND DECOMPRESSION DEVICE

BACKGROUND OF THE INVENTION

1. Field of the Invention

The present invention relates to devices for compressing/decompressing map data, and more particularly to devices for compressing/decompressing data which represents shapes of objects on a map in vector format.

2. Description of the Background Art

In map data, objects required for rendering a map (typically, roads, buildings, rivers, and green belts) are each generally represented in vector format by a set of element points for specifying the shape of the object. Conventionally, each object is represented by a string of sets of element points all of which are typically represented by normalized coordinate values. However, such map data is not suitable for distribution via communication or broadcasting because of its data size, therefore in recent years, various map data compression methods have been proposed. Hereinafter, an exemplary conventional map data compression method is described.

In the conventional compression method, element points of each object are represented by either normalized coordinate values or first-order differential values. Here, the "first-order differential value" refers to a differential value between a normalized coordinate value of a target element point and a normalized coordinate value of the one before the target element point. For example, in the case where the normalized coordinate value of the target element point is (X1, Y1) and the normalized coordinate value of the immediately preceding element point is (X0, Y0), the first-order differential value is represented by (X1−X0, Y1−Y0). Such a first-order differential value is employed to compress the size of data for specifying each element point (see, for example, European Patent Publication No. EP1134674 A1).

It is expected that the demand for map distribution is further increased in the future, and map data is used even with data terminal apparatuses which can be equipped with merely a small capacity storage device. However, conventional compression methods are unsatisfactory with respect to size of compressed data, and therefore disadvantageous in that they cannot be adapted to an increase in use of the map data.

Most of the data terminal apparatuses that receive map distribution are mobile apparatuses such as navigation apparatuses, and therefore acquire map data through a mobile communication network. However, in most cases, the billing system for mobile communication services is based on the amount of use, therefore the conventional compression methods are disadvantageous in that users' communication cost adds up considerably because of the unsatisfactory size of compressed data.

SUMMARY OF THE INVENTION

Therefore, an object of the present invention is to provide a compression device, which is able to compress map data with a higher compression ratio, and a decompression device compatible therewith.

A compression device of the present invention is a compression device for compressing map data, comprising: a data acquisition unit for acquiring data containing a plurality of element points for specifying a shape of an object composing the map data; and a second-order differential value calculation unit for calculating a second-order differential value of a predetermined one of the plurality of element points acquired by the data acquisition unit. Here, the second-order differential value is a differential value between a first-order differential value of the predetermined element point and a first-order differential value of an immediately preceding element point, and the first-order differential value is a differential value between a coordinate value of the predetermined element point and a coordinate value of an immediately preceding element point. The compression device of the present invention further comprises a compressed data generation unit for generating compressed data containing the second-order differential value calculated by the second-order differential value calculation unit.

In the compression device of the present invention, the compressed data generation unit generates compressed data, which at least contains a coordinate value of a first element point, a first-order differential value of a second element point, and second-order differential values of remaining element points, based on the data acquired by the data acquisition unit and the second-order differential value calculated by the second-order differential value calculation unit.

The compression device of the present invention further comprises: an element point setting unit for setting, as a boundary element point, at least one of the plurality of element points acquired by the data acquisition unit; and a grouping unit for dividing the plurality of element points acquired by the data acquisition unit into a plurality of groups based on the boundary element point set by the element point setting unit. Here, the compressed data generation unit generates compressed data which at least contains, in any of the groups obtained by division by the grouping unit, a coordinate value of a first element point, a first-order differential value of a second element point, and second-order differential values of remaining element points, and at least contains, in other groups, a first-order differential value of a first element point and second-order differential values of remaining element points.

The compression device of the present invention further comprises a comparison unit for comparing, for each element point acquired by the data acquisition unit, a number of bits required for representing a first-order differential value and a number of bits required for representing a second-order differential value. Here, the element point setting unit sets, as boundary element points, all element points in which a number of bits of the second-order differential value is greater than a number of bits of the first-order differential value.

The compression device of the present invention further comprises an information assignment unit for assigning each group obtained by division by the grouping unit with a total number of element points which belong to a target group and a continuation flag which indicates whether there is any following group. Here, the compressed data generation unit generates compressed data, which contains, in any of the groups obtained by division by the grouping unit, a coordinate value of a first element point, a first-order differential value of a second element point, second-order differential values of remaining element points, a total number of element points in the group, and the continuation flag, and contains, in other groups, a first-order differential value of a first element point, second-order differential values of remaining element points, a total number of element points in the group, and the continuation flag.

In the compression device of the present invention, the data acquisition unit further acquires data containing a plurality of element points for specifying a shape of an object composing road congestion information.

A decompression device for decompressing map data according to the present invention comprises: a compressed data acquisition unit for acquiring compressed data at least containing a second-order differential value which makes it possible to specify positions of element points for specifying an object composing the map data. Here, the second-order differential value is a differential value between a first-order differential value of a predetermined element point and a first-order differential value of an immediately preceding element point, and the first-order differential value is a differential value between a coordinate value of the predetermined element point and a coordinate value of the immediately preceding element point. The decompression device of the present invention further comprises: a first-order differential value deriving unit for deriving a first-order differential value of a target element point from the second-order differential value acquired by the compressed data acquisition unit; and a data generation unit for generating data for specifying the shape of the object composing the map data, based on the first-order differential value of the element point derived by the first-order differential value deriving unit.

With this structure, it is possible to accurately and rapidly decompress the map data compressed by the compression device.

A compression method of the present invention is a compression method for compressing map data, comprising: a data acquisition step of acquiring data containing a plurality of element points for specifying a shape of an object composing the map data; and a second-order differential value calculation step of calculating a second-order differential value of a predetermined one of the plurality of element points acquired by the data acquisition step. Here, the second-order differential value is a differential value between a first-order differential value of the predetermined element point and a first-order differential value of an immediately preceding element point, and the first-order differential value is a differential value between a coordinate value of the predetermined element point and a coordinate value of the immediately preceding element point. The compression method further comprises a compressed data generation step of generating compressed data containing the second-order differential value calculated by the second-order differential value calculation step.

A decompression method of the present invention is a decompression method for decompressing map data, comprising a compressed data acquisition step of acquiring compressed data at least containing a second-order differential value which makes it possible to specify positions of element points for specifying an object composing the map data. Here, the second-order differential value is a differential value between a first-order differential value of a predetermined element point and a first-order differential value of an immediately preceding element point, and the first-order differential value is a differential value between a coordinate value of the predetermined element point and a coordinate value of the immediately preceding element point. The decompression method further comprises a first-order differential value deriving step of deriving a first-order differential value of a target element point from the second-order differential value acquired by the compressed data acquisition step; and a data generation step of generating data for specifying the shape of the object composing the map data, based on the first-order differential value of the element point derived by the first-order differential value deriving step.

A storage medium having stored therein a computer program according to the present invention has stored therein a computer program for compressing map data. The computer program comprises: a data acquisition step of acquiring data containing a plurality of element points for specifying a shape of an object composing the map data; and a second-order differential value calculation step of calculating a second-order differential value of a predetermined one of the plurality of element points acquired by the data acquisition step. Here, the second-order differential value is a differential value between a first-order differential value of the predetermined element point and a first-order differential value of an immediately preceding element point, and the first-order differential value is a differential value between a coordinate value of the predetermined element point and a coordinate value of the immediately preceding element point. The computer program further comprises a compressed data generation step of generating compressed data containing the second-order differential value calculated by the second-order differential value calculation step.

A storage medium having stored therein a computer program according to the present invention has stored therein a computer program for decompressing map data. The computer program comprises a compressed data acquisition step for acquiring compressed data at least containing a second-order differential value which makes it possible to specify positions of element points for specifying a shape of an object composing the map data. Here, the second-order differential value is a differential value between a first-order differential value of a predetermined element point and a first-order differential value of an immediately preceding element point, and the first-order differential value is a differential value between a coordinate value of the predetermined element point and a coordinate value of the immediately preceding element point. The computer program further comprises: a first-order differential value deriving step of deriving a first-order differential value of a target element point from the second-order differential value acquired by the compressed data acquisition step; and a data generation step of generating data for specifying the shape of the object composing the map data, based on a first-order differential value of the element point derived by the first-order differential value deriving step.

A storage medium having stored therein data according to the present invention has stored therein data containing a plurality of element points for specifying a shape of an object composing map data. The data contains: any one of a normalized coordinate value, which specifies a position of at least one reference element point, and an absolute coordinate value; a first-order differential value for specifying a position of an element point immediately after the reference element point; and a second-order differential value for specifying a position of an element point following the element point represented by the first-order differential value.

A map distribution system of the present invention comprises: a map distribution apparatus for compressing map data and distributing the compressed map data; and a data terminal apparatus for generating a map image based on the compressed map data distributed by the map distribution apparatus. The map distribution apparatus includes: a storage device for storing map data containing a plurality of element points for specifying a shape of an object composing the map image; and a compression device for compressing the map data stored in the storage device, and generating compressed map data in which a position of a predetermined element point is represented by a second-order differential value. Here, the second-order differential value is a differential value between a first-order differential value of the predetermined element point and a first-order differential value of an immediately preceding element point, and the first-order differential value is a differential value between a coordinate value of the predetermined element point and a coordinate value of the immediately preceding element point. The map distribution apparatus further includes a transmission device for transmitting the compressed map data generated by the compression device to a transmission path. Also, the data terminal apparatus includes: a reception device for receiving the compressed map data transmitted by the transmission device via the transmission path; a decompression device for decompressing the compressed map data received by the reception device, and generating at least map data in which the position of the element point represented by the second-order differential value is represented by the first-order differential value; a rendering device for generating a map image based on the map data generated by the decompression device; and a display device for displaying the map image generated by the rendering device.

These and other objects, features, aspects and advantages of the present invention will become more apparent from the following detailed description of the present invention when taken in conjunction with the accompanying drawings.

BEST MODE FOR CARRYING OUT THE INVENTION

Figure 1:
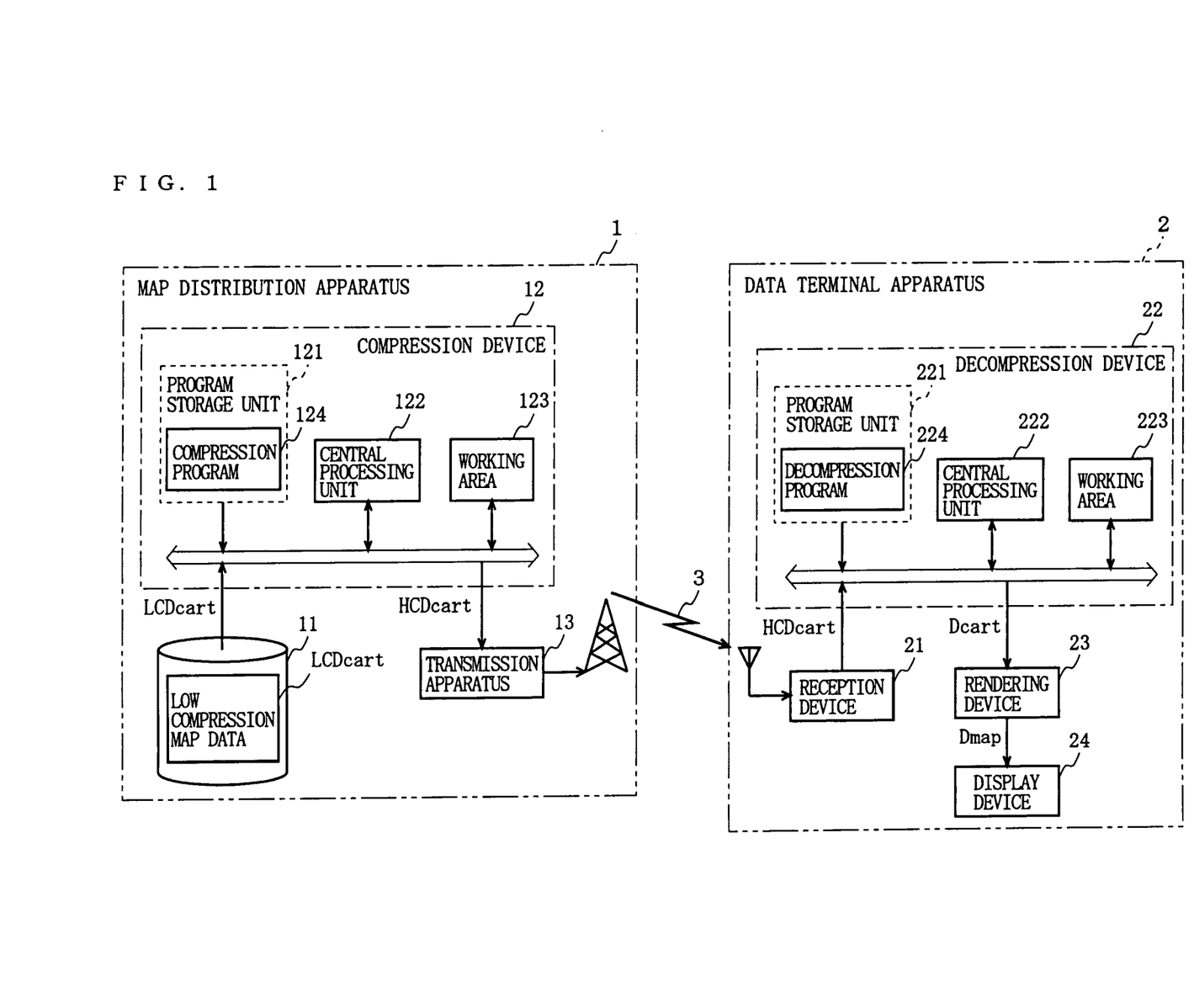
FIG. 1 is a block diagram showing an overall structure of a map distribution system having incorporated therein compression and decompression devices 12 and 22 according to an embodiment of the present invention.

FIG. 1 is a block diagram showing an overall structure of a map distribution system having incorporated therein compression and decompression devices according to an embodiment of the present invention. In FIG. 1, the map distribution system includes a map distribution apparatus 1 and a data terminal apparatus 2. In order to provide a map to the data terminal apparatus 2 via a wired or wireless transmission path 3, the map distribution apparatus 1 includes a storage device 11, a compression device 12, and a transmission device 13.

The storage device 11 preferably stores low compression map data LCDcart which is subjected to a compression process in the compression device 12 located downstream thereof. The low compression map data LCDcart is generated based on map data Dcart, and defines at least contours of objects (typically, roads, buildings, rivers, and green belts) which are each required for rendering a map. Here, the map data Dcart is typically vector-format data in which in order to specify positions of a plurality of element points constituting the contour of each object, all the element points are represented by normalized coordinate values. As is well known, in the map distribution, a map is distributed in units of predetermined sections. The normalized coordinate values are two-dimensional coordinate values within such units. Note that the low compression map data LCDcart may contain absolute coordinate values instead of containing the normalized coordinate values. The absolute coordinate values are two-dimensional coordinate values relative to a predetermined position on the map, and can be represented by, for example, (latitude, longitude).

Figure 2:
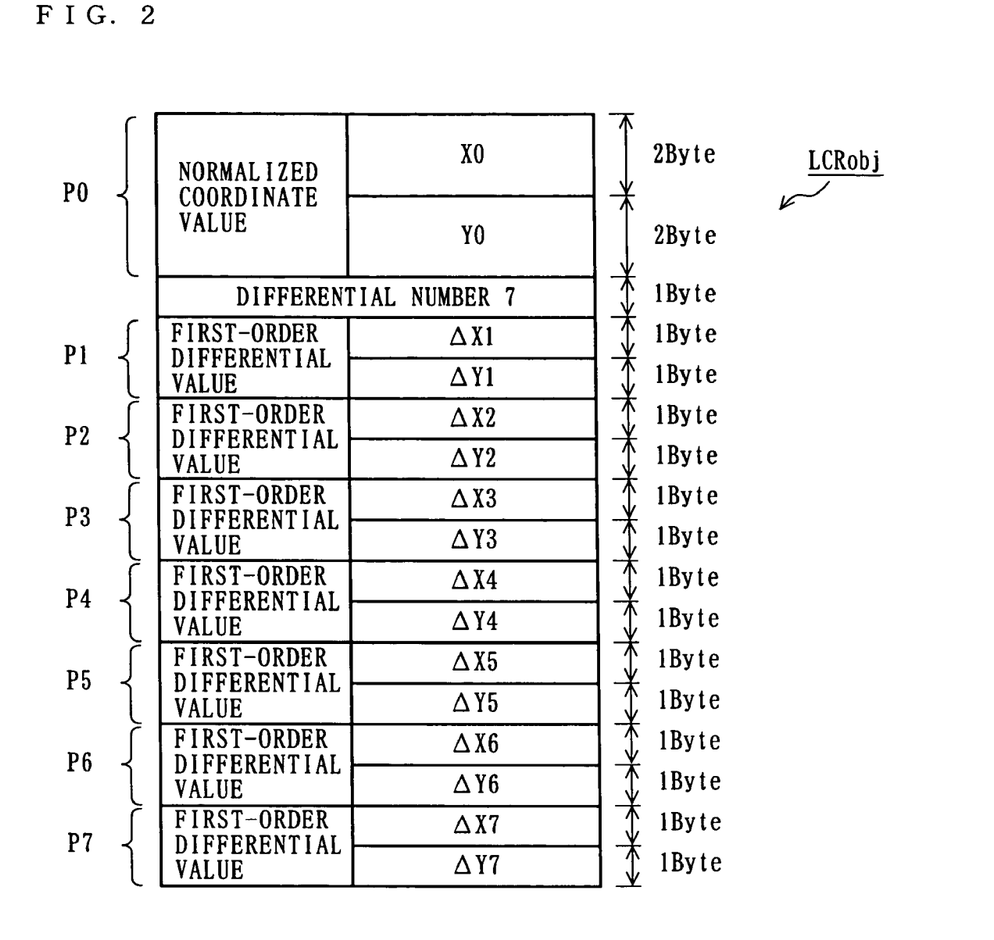
FIG. 2 is a schematic diagram showing a data structure of low compression map data LCDcart stored in a storage device 11 of FIG. 1.

More specifically, the above-described low compression map data LCDcart preferably contains a data string, which consists at least of one normalized coordinate value and one or more first-order differential values, as a low compression object record LCRobj as shown in FIG. 2. In the low compression object record LCRobj, the normalized coordinate value is typically located at the head of the data string to specify a two-dimensional coordinate position of an element point which is used as a reference in rendering an object. Note that in the present embodiment, by way of example, the normalized coordinate value is represented by a total of four bytes. Each first-order differential value is for specifying the position of a target element point other than the reference element point, and is a differential value between the target element point and the normalized coordinate value of an immediately preceding element point in the data string. Note that in the present embodiment, by way of example, the first-order differential value is represented by a total of two bytes.

Figure 3:
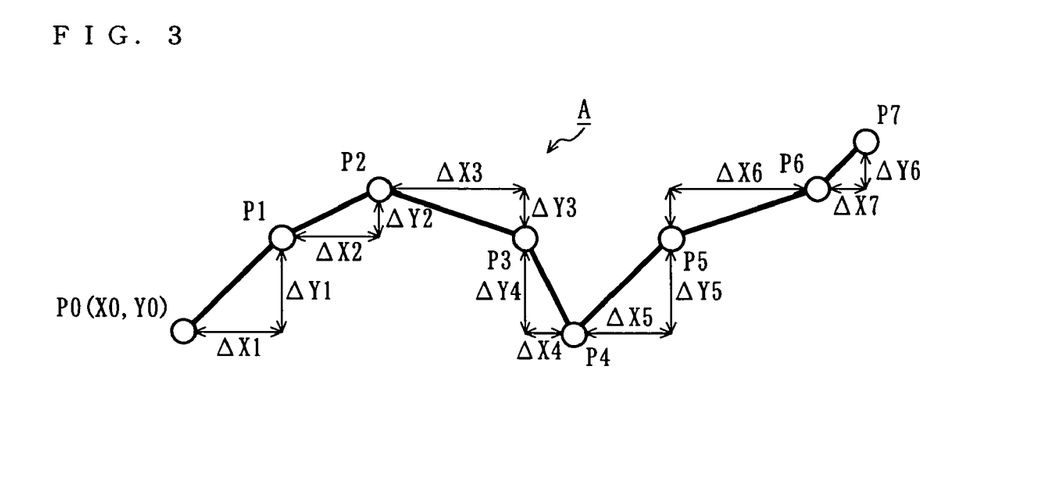
FIG. 3 is a schematic diagram showing a linear object A represented by the low compression map data LCD of FIG. 2.

For example, assume now a linear object A as shown in FIG. 3 which is obtained by sequentially connecting eight element points P0 through P7. In the case of specifying the shape of such an object A, the low compression object record LCRobj contains, as shown in FIG. 2, the normalized coordinate value (X0, Y0) of the element point P0, and first-order differential values ($\Delta$X1, $\Delta$Y1) through ($\Delta$X7, $\Delta$Y7) of the element points P1 through P7. Here, if the normalized coordinate value of the element point P1 is (X1, Y1), the first-order differential value ($\Delta$X1, $\Delta$Y1) is represented by (X1-X0, Y1-Y0). The first-order differential values ($\Delta$X2, $\Delta$Y2) through ($\Delta$X7, $\Delta$Y7) are calculated in a manner similar to the first-order differential value ($\Delta$X1, $\Delta$Y1).

The compression device 12 includes, as shown in FIG. 1, a program storage unit 121, a central processing unit 122, and a working area 123. The program storage unit 121 is a storage medium typified by a ROM (Random Access Memory), and has stored therein a computer program (hereinafter, referred to as a "compression program") 124 which describes the procedure of a compression process as described later. With the above structure, the compression device 12 further compresses the low compression map data LCDcart stored in the storage device 11 to generate high compression map data HCDcart in accordance with the compression program 124. Note that the details of the compression process by the compression device 12 will be described later. The transmission device 13 transmits to the data terminal apparatus 2 the high compression map data HCDcart generated by the compression device 12.

The data terminal apparatus 2 is typically a car navigation apparatus, and at least includes, as shown in FIG. 1, a reception device 21, a decompression device 22, a rendering device 23, and a display device 24. The reception device 21 receives the high compression map data HCDcart, which is transmitted via the transmission path 3, and passes it to the decompression device 22.

The decompression device 22 includes, as shown in FIG. 1, a program storage unit 221, a central processing unit 222, and a working area 223. The program storage unit 221 is a storage medium typified by a ROM, and has stored therein a computer program (hereinafter, referred to as a "decompression program") 224 which describes the procedure of a decompression process as described later. With the above structure, the decompression device 22 processes the high compression map data HCDcart transmitted from the reception device 21 in accordance with the decompression program 224 thereby to reproduce vector-format map data Dcart, which in the present embodiment, contains a normalized coordinate string but does not contain either a first-order differential value or a second-order differential value, and passes it to the rendering device 23. Note that the details of the decompression process by the decompression device 22 will be described later.

The rendering device 23 is generally realized by the program storage unit 221, the central processing unit 222, and the working area 223, and renders a map based on the map data Dcart reproduced by the decompression device 22. More specifically, the rendering device 23 generates map image data Dmap, which represents a map image, from the received map data Dcart. Further, the rendering device 23 passes the generated map image data Dmap to the display device 24. The display device 24 displays, based on the map image data Dmap transmitted from the rendering device 23, a map image represented thereby on its own display.

Described next are operations of the map distribution apparatus 1 and the data terminal apparatus 2 which are configured as described above. The map distribution apparatus 1 receives a request from, for example, the data terminal apparatus 2. With this request, the data terminal apparatus 2 designates at least a range which is currently desired by the data terminal apparatus 2 from within the range of a map which can be provided by the map distribution apparatus 1. In the map distribution apparatus 1, in response to the above request, the storage device 11 reads and transfers low compression map data LCDcart as designated to the working area 123 of the compression device 12.

Figure 4:
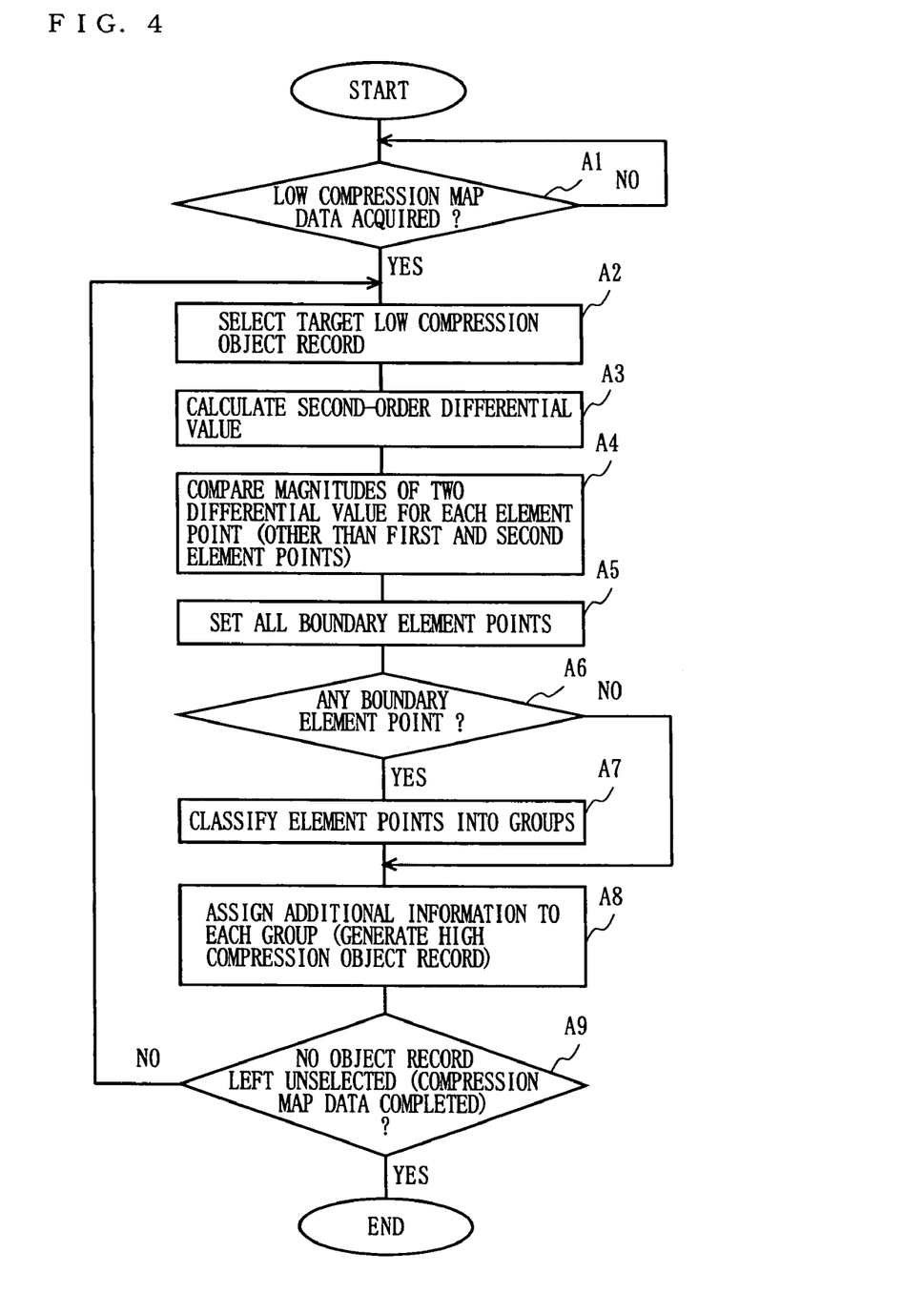
FIG. 4 is a flowchart used for explaining an operation of the compression device 12 shown in FIG. 1.

In the compression device 12, the central processing unit 122 executes the compression program 124 stored in the program storage unit 121, and further compresses the low compression map data LCDcart acquired from the storage device 11 in accordance with the process procedure shown in FIG. 4. Specifically, as shown in FIG. 4, upon acquisition of the low compression map data LCDcart from the storage device 11 (step A1), the central processing unit 122 selects a piece of low compression object record LCRobj from the acquisition (step A2). Note that hereinafter, the low compression object record LCRobj selected in step A2 is referred to as a "target low compression object record LCRobj", and an object specified by the target low compression object record LCRobj is referred to as a "target object". Also, for ease of explanation, the target low compression object record LCRobj is assumed to specify the shape of the object A shown in FIG. 3.

Next, the central processing unit 122 calculates second-order differential values of all element points other than the first and second element points (step A3). Here, the second-order differential value is a differential value between a first-order differential value of a target element point and a first-order differential value of an element point located immediately before the target element point. Under the above assumption, second-order differential values $\Delta\Delta P2$ through $\Delta\Delta P7$ of the element points P2 through P7 are calculated. For example, the second-order differential value $\Delta\Delta P2$ is represented by $(\Delta X2-\Delta X1, \Delta Y2-\Delta Y1)$.

Next, the central processing unit 122 compares all element points other than the first and second element points with respect to the magnitude of the second-order differential value and the magnitude of the first-order differential value (step A4). Under the above assumption, for example, the second-order differential value $\Delta\Delta P2$ and the first-order differential value $\Delta P2$ are compared in magnitude with each other. Here, taking the second-order differential value $\Delta\Delta P2$ as an example, the magnitude of the second-order differential value is expressed by $\sqrt{\{(\Delta X2-\Delta X1)^2+(\Delta Y2-\Delta Y1)^2\}}$. Similarly, taking the first-order differential value $\Delta P2$ as an example, the magnitude of the first-order differential value is expressed by $\sqrt{\{(X2-X1)^2+(Y2-Y1)^2\}}$.

Incidentally, in the sections of the outline of a target object that have a shape closer to a straight line, the second-order differential value of an element point is generally smaller than the first-order differential value of the same element point. In contrast, in the sections of the outline of a target object that have a higher curvature, the second-order differential value of an element point is greater than the first-order differential value of the same element point. Incidentally, various objects are required for composing a map. Among the objects, in particular, roads are designed to avoid as much as possible being a sharp curve such that vehicles are able to readily travel thereon. Rivers are also designed so as not to curve very sharply. Accordingly, inmost cases, if the second-order differential value of the target element point is compared with the first-order differential value thereof, the second-order differential value is smaller in magnitude. Thus, it is possible to represent the second-order differential value with the number of bits less than those of the first-order differential value. In the present embodiment, by way of example, the second-order differential value is represented by a total of 12 bits which are less than the number of bits of the first-order differential value.

Note that in the above step A4, the comparison is made between, but not limited to, the magnitude of the second-order differential value and the magnitude of the first-order differential value. For example, in the case where the first-order differential value is (130, 0), and the second-order differential value is (127, −127), the magnitude of the first-order differential value is 130 and the magnitude of the second-order differential value is about 180, so that the second-order differential value is greater. As for the number of required bits, the first-order differential value can be represented by 9 bits from −255 to +255, while the second-order differential value can be represented by 8 bits from −127 to +127, therefore the comparison may be made between the number of bits required for representing a target element point with the second-order differential value and the number of bits required for representing the same element point with the first-order differential value.

Next, for the following steps A6 and A7, the central processing unit 122 stores, as a boundary element point, any element point at which the second-order differential value is greater (step A5). In the present embodiment, as shown in FIG. 3, the object A sharply curves at the element point P4, and therefore it is assumed that the element point P4 is stored as the boundary element point in step A5.

Note that in the case where the comparison is made, as described above, with respect to the number of bits, the central processing unit 122 stores, as the boundary element point, an element point which requires a greater number of bits when it is represented by the second-order differential value than when it is represented by the first-order differential value.

Next, the central processing unit 122 determines whether there is any boundary element point (step A6), and if there is any one boundary element point, element points contained in the target object record Robj are classified into groups with respect to each boundary element point (step A7). More specifically, the central processing unit 122 allocates a first group with element points in the range from the first element point to an element point immediately before the first boundary element point. In the first group, the position of the first element point is specified by a normalized coordinate value, the position of the second element point is specified by a first-order differential value, and the positions of remaining element points are specified by second-order differential values. Also, a second group is allocated with element points in the range from the first boundary element point to an element point immediately before the next boundary element point. Further groups are similarly generated, and the central processing unit 122 allocates the last group with element points from the last boundary element point to the last element point. Here, in the second and subsequent groups, the position of the first boundary element point is specified by a first-order differential value, and remaining element points are specified by second-order differential values. Upon completion of the above step A7, the central processing unit 122 carries out step A8. Under the above assumption, the element points P0 through P4 are allocated to the first group, and the element points P5 through P7 are allocated to the second group.

If it is determined in step A6 that there is no boundary element point, the central processing unit 122 does not necessarily carry out grouping because there is only one group that can be formed. Accordingly, the central processing unit 122 skips step A7, and carries out step A8.

Figure 5:
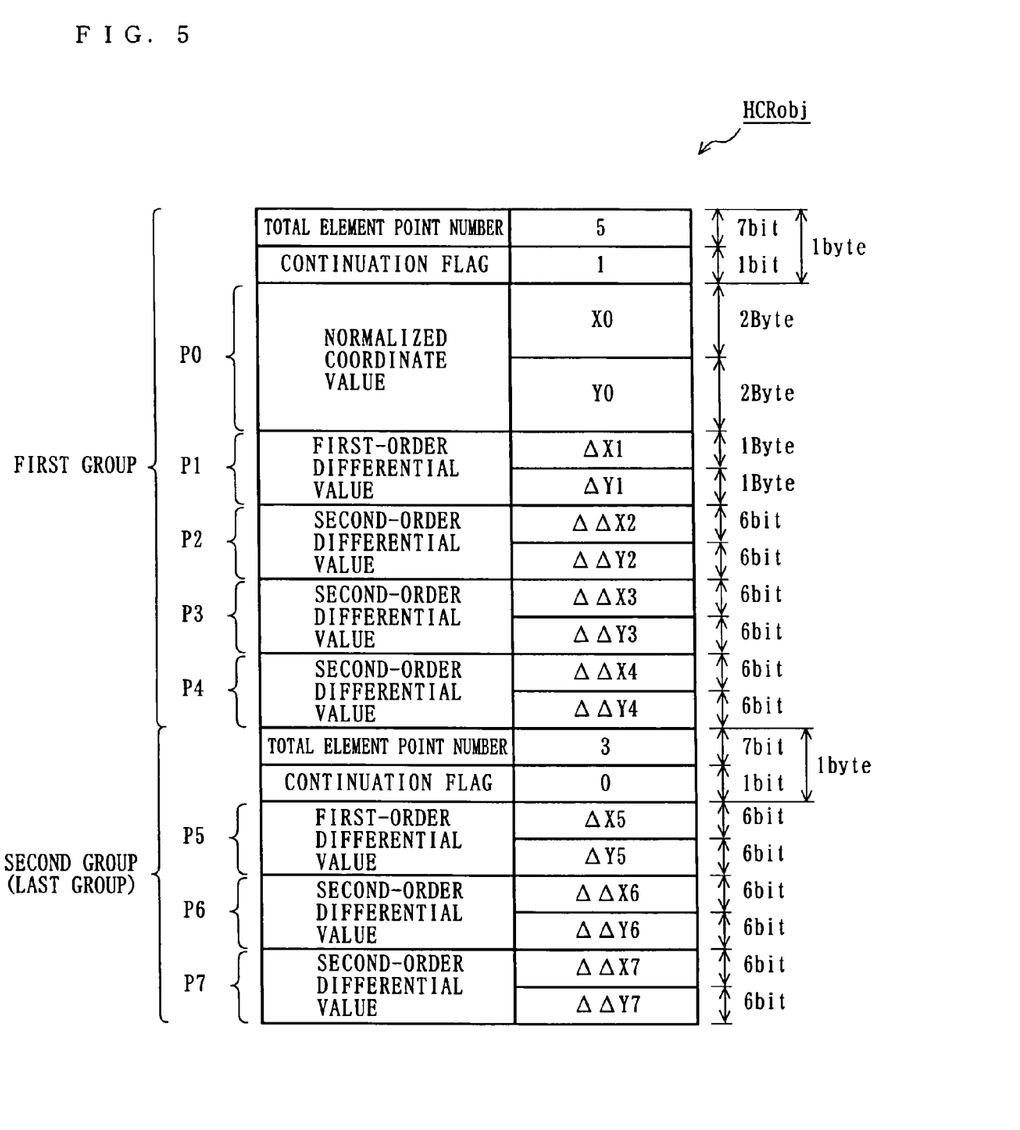
FIG. 5 is a schematic diagram showing a data structure of high compression object record HCRobj generated by the compression device 12 shown in FIG. 1.

After step A6 or A7, the central processing unit 122 assign additional information to each group generated in step A7, thereby generating a high compression object record HCRobj as shown in FIG. 5 (step A8). Here, the additional information at least contains a total element point number and a continuation flag. The total element point number indicates the total number of element points which belong to a target group, and in the present embodiment, it is exemplarily represented by 7 bits. The continuation flag is a flag for specifying whether there is any following group which belongs to the same target object as that of the target group, and preferably it is represented by 1 bit. In the present embodiment, by way of example, if the continuation flag is 1, there is a following group which belongs to the same target object. In contrast, if the continuation flag is 0, it indicates that there is no following group which belongs to the same target object. Accordingly, the continuation flag of 0 is assigned only to the last group.

The above process of step A8 makes it possible for the central processing unit 122 to compress the target low compression object record LCRobj and thereby to generate the high compression object record HCRobj. Here, in the high compression object record HCRobj, as shown in FIG. 5, positions of most element points are represented using the second-order differential value. As is apparent from the foregoing, the second-order differential value can be represented with the number of bits less than those of the first-order differential value. This allows the map data Dcart to be compressed with a compression ratio higher than before.

Also, the central processing unit 122 repeats processes as specified by steps A2 through A8 until it is determined in step A9 that there is no object record Robj left unselected in step A2. If there is no object record Robj left unselected, high compression map data HCDcart consisting of at least one high compression object record HCRobj is completed, and the central processing unit 122 terminates the procedure of FIG. 4.

The transmission device 13 performs a well-known process on the high compression map data HCDcart generated as described above, and transmits it to the transmission path 3. The transmitted high compression map data HCDcart is delivered through the transmission path 3 to the data terminal apparatus 2.

In the data terminal apparatus 2, the reception device 21 receives the delivered high compression map data HCDcart, and transfers it to the working area 223 of the decompression device 22.

Figure 6:
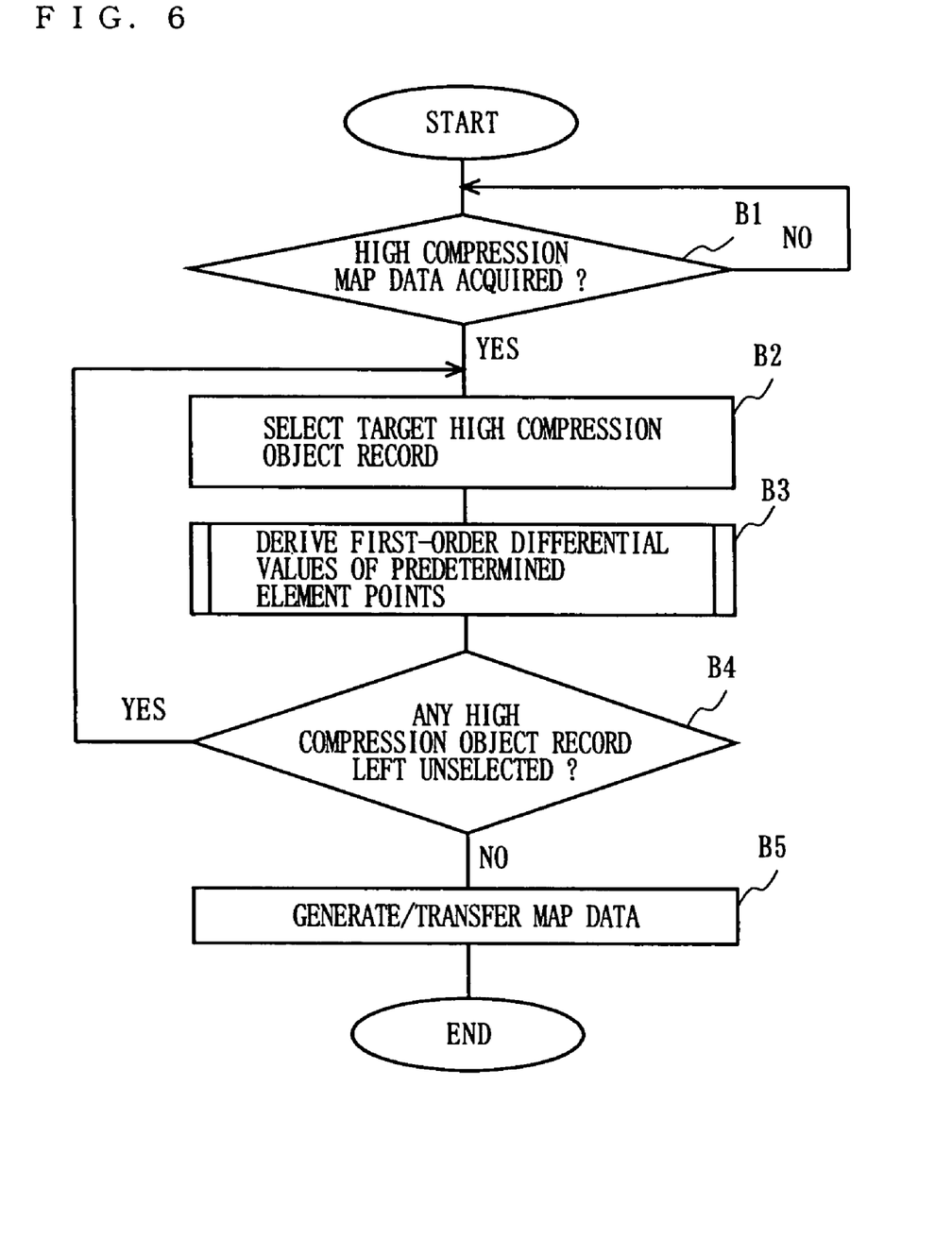
FIG. 6 is a flowchart used for explaining an operation of the decompression device 22 shown in FIG. 1.

In the decompression device 22, the central processing unit 222 executes the decompression program 224 stored in the program storage unit 221, and decompresses the high compression map data HCDcart stored in the working area 223 in accordance with the process procedure shown in FIG. 6, thereby reproducing map data Dcart in which all element points are represented by the normalized coordinate value or the absolute coordinate value. Specifically, as shown in FIG. 6, the central processing unit 222 acquires the high compression map data HCDcart from the reception device 21 (step B1), and selects one high compression object record HCRobj from the currently acquired high compression map data HCDcart (step B2). Note that hereinafter, the high compression object record HCRobj selected in step B2 is referred to as a "target high compression object record HCRobj", and an object specified by the target high compression object record HCRobj is referred to as a "target object". Also, for ease of explanation, the currently selected high compression object record HCRobj is assumed to be that shown in FIG. 5.

Figure 7:
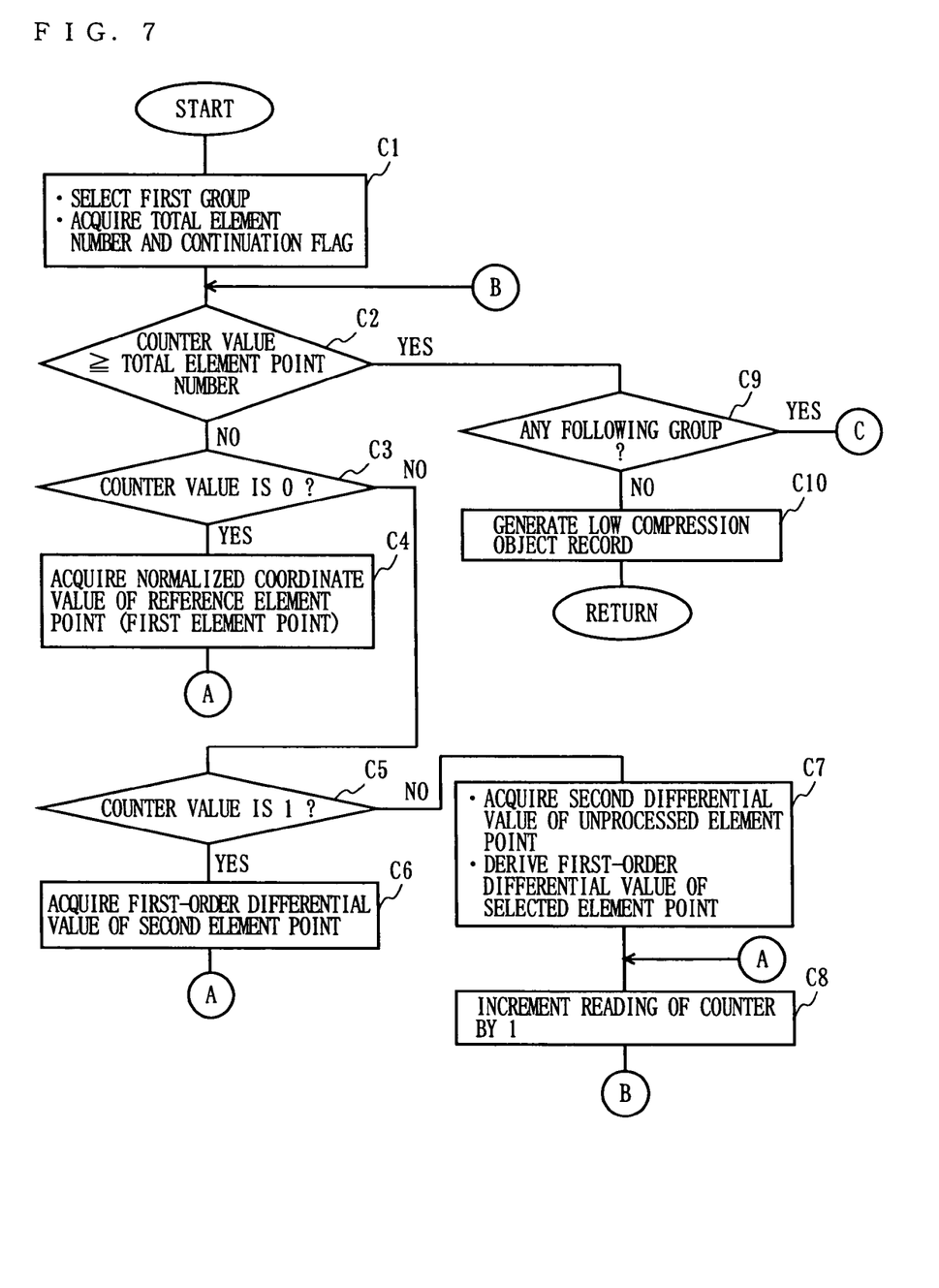
FIG. 7 is a flowchart showing a first portion of the detailed process of step B3 shown in FIG. 6.
Figure 8:
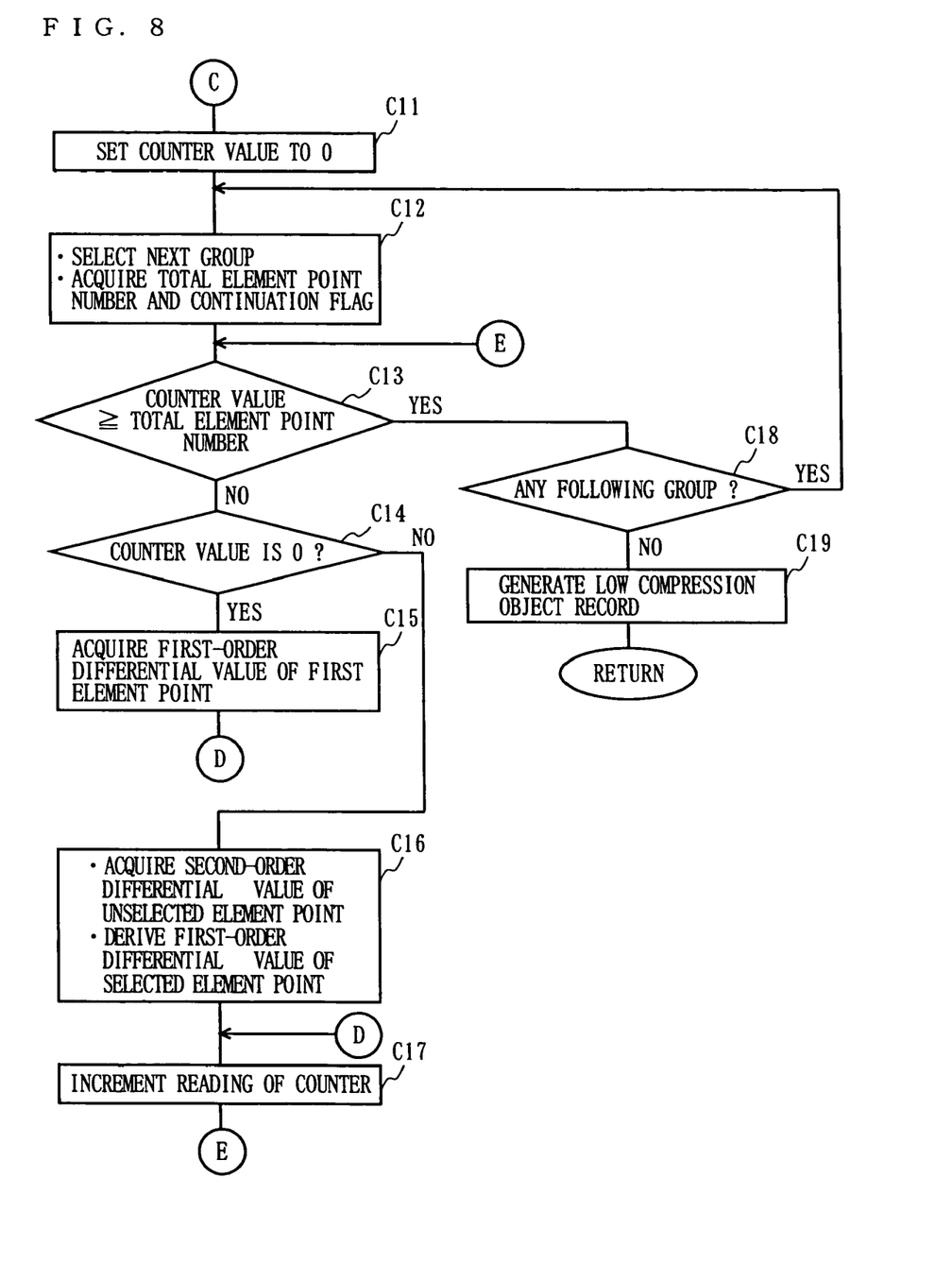
FIG. 8 is a flowchart showing a second portion of the detailed process of step B3 shown in FIG. 6.

Next, in order to define the contour of the target object, the central processing unit 222 derives first-order differential values of all element points represented by the second-order differential value (step B3). FIGS. 7 and 8 constitute a flowchart showing the detailed process of step B3. Firstly, in FIG. 7, the central processing unit 222 selects the first group from the target high compression object record HCRobj, and thereafter acquires additional information assigned to the selected group, i.e., the total element point number and the continuation flag (step C1). Under the above assumption, the acquired total element point number is 5, and the acquired continuation flag is 1.

Next, the central processing unit 222 sets a counter, which is used for counting the number of processed element points, to 0, and thereafter determines whether the reading of the counter is equal to or more than the total element point number acquired in step C1 (step C2).

If it is determined in step C2 that the reading is not equal to or more than the total element point number, the central processing unit 222 determines whether the reading of the counter is 0 (step C3), and if the reading is 0, it acquires the normalized coordinate value of a reference element point, i.e., the first element point, from the first group of the target high compression object record HCRobj (step C4). Under the above assumption, the normalized coordinate value (X0, Y0) of the element point P0 is acquired. Note that a process in the case where it is determined in step C2 that the reading is equal to or more than the total element point number will be described later.

Also, if the reading is not 0 in step C3, the central processing unit 222 determines whether the reading is 1 (step C5) In this case, if the reading is 1, the central processing unit 222 acquires and stores the first-order differential value of an element point immediately after the reference element point, i.e., the second element point, in the first group (step C6). Under the above assumption, the first-order differential value ($\Delta X1$, $\Delta Y1$) of the element point P1 is acquired.

Also, if the reading is not 1 in step C5, the reading is equal to or more than 2, therefore in step C7, the central processing unit 222 acquires, from the first group, the second-order differential value of an element point located at the top of one or more element points from which no first-order differential value has been derived. Thereafter, the central processing unit 222 derives the normalized coordinate value of the target element point based on normalized coordinate values of first and second element points immediately preceding the target element point, and the currently acquired second-order differential value (step C7). For example, if the second-order differential value ($\Delta\Delta X2$, $\Delta\Delta Y2$) of the element point P2 is acquired, the first-order differential value ($\Delta X2$, $\Delta Y2$) of the element point P2 is derived based on the first-order differential value ($\Delta X1$, $\Delta Y1$) of the immediately preceding element point P1. More specifically, $\Delta X2$ is equal to $\Delta X1+\Delta X2$, and $\Delta Y2$ is equal to $\Delta Y1+\Delta\Delta Y2$. First-order differential values of other element points, P3 and P4, are similarly derived.

After any of the above steps C4, C6 and C7 is completed, the central processing unit 222 increments the reading of the counter by 1 (step C8), and returns to step C2. Here, if the reading is equal to or more than the total element point number in step C2, the first-order differential values are derived for all element points in the first group that are represented by the second-order differential values, therefore the central processing unit 222 refers to the continuation flag acquired in step C1, and determines whether there is any following group (step C9). Specifically, if the continuation flag is 1, it is determined that the second group is left unprocessed.

Also, if it is determined in step C9 that there is no group left, the central processing unit 222 sequentially arranges the currently acquired normalized coordinate value of the reference element point, the first-order differential value of the second element point, and the currently derived third and subsequent first-order differential values, and further adds the number of element points represented by the first-order differential value, thereby generating the low compression object record LCRobj as shown in FIG. 2 in the working area 223 (step C10). Note that if necessary, information required for rendering the target object (not shown) is also added in step C10. Examples of such information include information for specifying the color and line type of the target object.

If it is determined in step C9 that there is any following group left unprocessed, the central processing unit 222 resets the counter to 0 (step C11 of FIG. 8), and thereafter it selects the next group and then acquires additional information of the selected group (step C12). Under the above assumption, the last group (see FIG. 5) is selected, so that the total element point number 3 is acquired, and the continuation flag 0 is acquired.

Next, the central processing unit 222 determines whether the reading of the counter is equal to or more than the total element point number acquired in step C12 (step C13).

If it is determined in step C13 that the reading is not equal to or more than the total element point number, the central processing unit 222 determines whether the reading of the counter is 0 (step C14), and if the reading is 0, it acquires the first-order differential value that specifies the position of the first element point from the currently selected group (step C15). Under the above assumption, the first-order differential value ($\Delta X5$, $\Delta Y5$) of the element point P5 is acquired. Note that a process in the case where it is determined in step C13 that the reading is equal to or more than the total element point number will be described later.

If the reading is not 0 in step C14, the reading is equal to or more than 1, therefore the central processing unit 222 acquires, from the currently selected group, the second-order differential value of an element point located at the top of one or more element points from which no first-order differential value has been derived. Thereafter, as in step C7, the central processing unit 222 derives the first-order differential value of the currently selected element point (step C16).

After any of the above steps C14 and C16 is completed, the central processing unit 222 increments the reading of the counter by 1 (step C17), and returns to step C13. Here, if the reading is equal to or more than the total element point number in step C13, normalized coordinates of all element points in the currently selected group are derived, therefore, as in step C9, the central processing unit 222 determines whether there is any following group from which the first-order differential value should be derived (step C18).

If it is determined in step C18 that there is no group left, the central processing unit 222 sequentially arranges the currently acquired normalized coordinate value of the reference element point, the first-order differential value of the second element point, and all the first-order differential values that have been derived up to this point, and further adds the number of element points represented by the first-order differential value, thereby generating the low compression object record LCRobj as shown in FIG. 2 in the working area 223 (step C19). Note that as described above, information required for rendering the target object (not shown) may be added in step C10.

After any of the above steps C10 and C19 is completed, the central processing unit 222 exits the process of FIGS. 7 and 8, and carries out step B4 of FIG. 6. Specifically, the central processing unit 222 determines whether there is any high compression object record HCRobj left in the currently received high compression map data HCDcart (step B4), and if there is any left, it returns to step B2. On the other hand, if there is none left, the central processing unit 222 generates low compression map data LCDcart, which contains all low compression object records LCRobj generated in the process of FIGS. 7 and 8, in the working area 223, and transfers the generated to the rendering device 23 (step B5).

The rendering device 23 renders a map based on the low compression map data LCDcart generated by the decompression device 22. More specifically, the rendering device 23 selects each low compression object record LCRobj from the received low compression map data LCDcart, and thereafter links the reference element point, which is contained in the selection and represented by the normalized coordinate value, to the second element point, which is located immediately after the reference element point and represented by the first-order differential value (i.e., a relative coordinate value to the reference element point). Thereafter, the rendering device 23 similarly draws lines to connect all element points, which are specified by relative coordinate values to their respective immediately preceding element points, thereby rendering the target object. As a result, the rendering device 23 generates map image data Dmap which represents a map image. Note that in this case, the rendering device 23 may superpose various types of data required for car navigation on the map image. Typical examples of the various types of data include a mark indicating the current position of the car, and a path which leads the car to a destination. Further, the rendering device 23 sends the generated map image data Dmap to the display device 24. Based on the map image data Dmap sent from the rendering device 23, the display device 24 displays the map image represented thereby on its own display.

As described above, according to the decompression device 22, it is possible to reproduce the low compression map data LCDcart from the high compression map data HCDcart compressed with a high compression ratio by the compression device 12 unique to the present invention. In addition, in order to derive the first-order differential value of a target element point, the decompression device 22 is only required to add the second-order differential value of the target element point to the first-order differential value of an immediately preceding element point, therefore it is possible to reproduce the low compression map data LCDcart at high speed.

Note that although the compression device 12 has been described in the above embodiment as generating the high compression map data HCDcart from the low compression map data LCDcart, it is not limited to this, and may generate the high compression map data HCDcart from the map data Dcart.

Further, although the compression program 124 and the decompression program 224 have been described in the above embodiment as being installed in the compression device 12 and the decompression device 22, respectively, they are not limited to this, and may be distributed in a state of being written on a storage medium typified by a CD (Compact Disk). Alternatively, the compression program 124 and the decompression program 224 may be distributed via a digital network.

Furthermore, although the high compression map data HCDcart has been described in the above embodiment as being distributed to the data terminal apparatus 2, it is not limited to this, and may be distributed in a state of being recorded on a storage medium typified by a CD and a DVD (Digital Versatile Disk). Alternatively, the high compression map data HCDcart may be stored in a storage device typified by a CD drive, a DVD drive, and a HDD (Hard Disk Drive) which is generally locally included in the data terminal apparatus 2. In this case, the decompression device 22 reads, from such a storage device, the high compression map data HCDcart, and decompresses it.

Further still, although the compression device 12 has been described in the above embodiment as performing a compression process on the low compression object records LCDcart, which specify the shapes of objects composing a map, it is not limited to this, and may compress data which specifies the shape of an object composing road congestion information (typically, a narrow) Also, the decompression device 22 may acquire and decompress compressed data which specifies the shape of the congestion information.

Further still, in the above embodiment, the compression device 12 has been described as being composed by the central processing unit 122, which executes the compression program 124, and the working area 123, while the decompression device 22 has been described as being composed by the central processing unit 222, which executes the decompression program 224, and the working area 223. However, they are not limited to this, and the compression device 12 and the decompression device 22 may be composed of hardware typified by gate arrays.

Further still, in the above embodiment, the decompression device 22 has been described as deriving the first-order differential value from the second-order differential value. However, it is not limited to this, and the decompression device 22 may be configured to derive the first-order differential value from the second-order differential value of an element point, and thereafter derive the normalized coordinate value or absolute coordinate value of the element point.

Further still, in the data terminal apparatus 2 in the above embodiment, the rendering device 23 renders a map image based on the low compression map data LCDcart, and the display device 24 displays the rendered map image. However, the data terminal apparatus 2 may use the low compression data LCDcart for a process, such as a path search or path guidance, which does not necessarily display the map image (typically, a turn-by-turn type data terminal apparatus 2).

While the invention has been described in detail, the foregoing description is in all aspects illustrative and not restrictive. It is understood that numerous other modifications and variations can be devised without departing from the scope of the invention.

What is claimed is:

1. A compression device for compressing map data, comprising:
    a data acquisition unit for acquiring data containing a plurality of element points for specifying a shape of an object composing the map data;
    a second-order differential value calculation unit for calculating a second-order differential value of a predetermined one of the plurality of element points acquired by the data acquisition unit, wherein the second-order differential value is a differential value between a first-order differential value of the predetermined element point and a first-order differential value of an immediately preceding element point, and the first-order differential value is a differential value between a coordinate value of the predetermined element point and a coordinate value of an immediately preceding element point; and
    a compressed data generation unit for generating compressed data containing the second-order differential value calculated by the second-order differential value calculation unit.

2. The compression device according to claim 1, wherein the compressed data generation unit generates compressed data, which at least contains a coordinate value of a first element point, a first-order differential value of a second element point, and second-order differential values of remaining element points, based on the data acquired by the data acquisition unit and the second-order differential value calculated by the second-order differential value calculation unit.

3. The compression device according to claim 2, further comprising:
    an element point setting unit for setting, as a boundary element point, at least one of the plurality of element points acquired by the data acquisition unit; and a grouping unit for dividing the plurality of element points acquired by the data acquisition unit into a plurality of groups based on the boundary element point set by the element point setting unit, wherein the compressed data generation unit generates compressed data which at least contains, in any of the groups obtained by division by the grouping unit, a coordinate value of a first element point, a first-order differential value of a second element point, and second-order differential values of remaining element points, and at least contains, in other groups, a first-order differential value of a first element point and second-order differential values of remaining element points.

4. The compression device according to claim 3, further comprising a comparison unit for comparing, for each element point acquired by the data acquisition unit, a number of bits required for representing a first-order differential value and a number of bits required for representing a second-order differential value, wherein the element point setting unit sets, as boundary element points, all element points in which a number of bits of the second-order differential value is greater than a number of bits of the first-order differential value.

5. The compression device according to claim 4, further comprising an information assignment unit for assigning each group obtained by division by the grouping unit with a total number of element points which belong to a target group and a continuation flag which indicates whether there is any following group, wherein the compressed data generation unit generates compressed data, which contains, in any of the groups obtained by division by the grouping unit, a coordinate value of a first element point, a first-order differential value of a second element point, second-order differential values of remaining element points, a total number of element points in the group, and the continuation flag, and contains, in other groups, a first-order differential value of a first element point, second-order differential values of remaining element points, a total number of element points in the group, and the continuation flag.

6. The compression device according to claim 1, wherein the data acquisition unit further acquires data containing a plurality of element points for specifying a shape of an object composing road congestion information.

7. A decompression device for decompressing map data, comprising:

a compressed data acquisition unit for acquiring compressed data at least containing a second-order differential value which makes it possible to specify positions of element points for specifying an object composing the map data, wherein the second-order differential value is a differential value between a first-order differential value of a predetermined element point and a first-order differential value of an immediately preceding element point, and the first-order differential value is a differential value between a coordinate value of the predetermined element point and a coordinate value of the immediately preceding element point;

a first-order differential value deriving unit for deriving a first-order differential value of a target element point from the second-order differential value acquired by the compressed data acquisition unit; and a data generation unit for generating data for specifying the shape of the object composing the map data, based on the first-order differential value of the element point derived by the first-order differential value deriving unit.

8. A compression method for compressing map data, comprising:

a data acquisition step of acquiring data containing a plurality of element points for specifying a shape of an object composing the map data;

a second-order differential value calculation step of calculating a second-order differential value of a predetermined one of the plurality of element points acquired by the data acquisition step, wherein the second-order differential value is a differential value between a first-order differential value of the predetermined element point and a first-order differential value of an immediately preceding element point, and the first-order differential value is a differential value between a coordinate value of the predetermined element point and a coordinate value of the immediately preceding element point; and a compressed data generation step of generating compressed data containing the second-order differential value calculated by the second-order differential value calculation step.

9. A decompression method for decompressing map data, comprising:

a compressed data acquisition step of acquiring compressed data at least containing a second-order differential value which makes it possible to specify positions of element points for specifying an object composing the map data, wherein the second-order differential value is a differential value between a first-order differential value of a predetermined element point and a first-order differential value of an immediately preceding element point, and the first-order differential value is a differential value between a coordinate value of the predetermined element point and a coordinate value of the immediately preceding element point;

a first-order differential value deriving step of deriving a first-order differential value of a target element point from the second-order differential value acquired by the compressed data acquisition step; and a data generation step of generating data for specifying the shape of the object composing the map data, based on the first-order differential value of the element point derived by the first-order differential value deriving step.

10. A computer readable storage medium having stored therein a computer program for compressing map data, the computer program comprising:

a data acquisition step of acquiring data containing a plurality of element points for specifying a shape of an object composing the map data;

a second-order differential value calculation step of calculating a second-order differential value of a predetermined one of the plurality of element points acquired by the data acquisition step, wherein the second-order differential value is a differential value between a first-order differential value of the predetermined element point and a first-order differential value of an immediately preceding element point, and the first-order differential value is a differential value between a coordinate value of the predetermined element point and a coordinate value of the immediately preceding element point; and a compressed data generation step of generating compressed data containing the second-order differential value calculated by the second-order differential value calculation step.

11. A computer readable storage medium having stored therein a computer program for decompressing map data, the computer program comprising:

a compressed data acquisition step for acquiring compressed data at least containing a second-order differential value which makes it possible to specify positions of element points for specifying a shape of an object composing the map data, wherein the second-order differential value is a differential value between a first-order differential value of a predetermined element point and a first-order differential value of an immediately preceding element point, and the first-order differential value is a differential value between a coordinate value of the predetermined element point and a coordinate value of the immediately preceding element point;

a first-order differential value deriving step of deriving a first-order differential value of a target element point from the second-order differential value acquired by the compressed data acquisition step; and a data generation step of generating data for specifying the shape of the object composing the map data, based on a first-order differential value of the element point derived by the first-order differential value deriving step.

12. A computer readable storage medium having stored therein data containing a plurality of element points for specifying a shape of an object composing map data, the data containing:

any one of a normalized coordinate value, which specifies a position of at least one reference element point, and an absolute coordinate value;

a first-order differential value for specifying a position of an element point immediately after the reference element point; and a second-order differential value for specifying a position of an element point following the element point represented by the first-order differential value.

13. A map distribution system, comprising:

a map distribution apparatus for compressing map data and distributing the compressed map data; and a data terminal apparatus for generating a map image based on the compressed map data distributed by the map distribution apparatus, wherein the map distribution apparatus includes:

a storage device for storing map data containing a plurality of element points for specifying a shape of an object composing the map image; and a compression device for compressing the map data stored in the storage device, and generating compressed map data in which a position of a predetermined element point is represented by a second-order differential value, wherein the second-order differential value is a differential value between a first-order differential value of the predetermined element point and a first-order differential value of an immediately preceding element point, and the first-order differential value is a differential value between a coordinate value of the predetermined element point and a coordinate value of the immediately preceding element point, wherein the map distribution apparatus further includes a transmission device for transmitting the compressed map data generated by the compression device to a transmission path, and wherein the data terminal apparatus includes:

a reception device for receiving the compressed map data transmitted by the transmission device via the transmission path;

a decompression device for decompressing the compressed map data received by the reception device, and generating at least map data in which the position of the element point represented by the second-order differential value is represented by the first-order differential value;

a rendering device for generating a map image based on the map data generated by the decompression device; and a display device for displaying the map image generated by the rendering device.

* * * * *